(12) United States Patent
Hua et al.

(10) Patent No.: US 12,542,730 B2
(45) Date of Patent: Feb. 3, 2026

(54) SYSTEMS, DEVICES, AND METHODS FOR HANDLING WIRELESS COMMUNICATIONS IN AN ANALYTE MONITORING ENVIRONMENT

(71) Applicant: ABBOTT DIABETES CARE INC., Alameda, CA (US)

(72) Inventors: Xuandong Hua, Mountain View, CA (US); Jean-Pierre Cole, Tracy, CA (US); Tony S. Lee, Alameda, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 0 days.

(21) Appl. No.: 16/852,178

(22) Filed: Apr. 17, 2020

(65) Prior Publication Data
US 2020/0336407 A1    Oct. 22, 2020

Related U.S. Application Data

(60) Provisional application No. 62/836,059, filed on Apr. 18, 2019.

(51) Int. Cl.
*H04L 45/02* (2022.01)
*A61B 5/00* (2006.01)
(Continued)

(52) U.S. Cl.
CPC ........... *H04L 45/026* (2013.01); *A61B 5/002* (2013.01); *H04W 4/80* (2018.02); *H04W 12/03* (2021.01);
(Continued)

(58) Field of Classification Search
CPC ... H04L 45/026; A61B 5/002; A61B 5/14532; A61B 5/0015; H04W 12/001;
(Continued)

(56) References Cited

U.S. PATENT DOCUMENTS 4,199,987 A    4/1980 Bauers et al.
5,381,798 A    1/1995 Burrows
(Continued)

FOREIGN PATENT DOCUMENTS

AU    2020257427    12/2025
CN    10395567 A    7/2014
(Continued)

OTHER PUBLICATIONS

Translation of JP-2019186756-A (Year: 2019).*
(Continued)

*Primary Examiner* — Matthew C Sams
(74) *Attorney, Agent, or Firm* — ONE LLP

(57) ABSTRACT

Example embodiments of systems, devices, and methods are described for communication in an analyte monitoring system in accordance with an applicable communication protocol. A first device of the system may transmit a command to a second device of the system and the second device may encounter a processing delay in preparing data responsive to the command. The second device may transmit dummy data to the first device in order to maintain compliance with the communication protocol until such time that the second device is ready to transmit data responsive to the command. Numerous different embodiments for incorporating and/or accommodating the presence of dummy data in a communication hierarchy are provided.

23 Claims, 7 Drawing Sheets

(51) Int. Cl.
*A61B 5/145* (2006.01)
*A61M 5/172* (2006.01)
*H04B 5/00* (2024.01)
*H04B 5/24* (2024.01)
*H04B 5/79* (2024.01)
*H04W 4/80* (2018.01)
*H04W 12/03* (2021.01)

(52) U.S. Cl.
CPC ........ *A61B 5/14532* (2013.01); *A61M 5/1723* (2013.01); *H04B 5/24* (2024.01); *H04B 5/79* (2024.01)

(58) Field of Classification Search
CPC ..... H04W 4/80; H04W 12/03; A61M 5/1723; H04B 5/0075; H04B 5/0037; G16H 10/40; G16H 20/17; G16H 40/67
See application file for complete search history.

(56) References Cited

U.S. PATENT DOCUMENTS

| | | | |
|---|---|---|---|
| 8,755,269 B2 * | 6/2014 | Jollota | H04W 72/02 370/242 |
| 9,949,642 B2 * | 4/2018 | Love | A61B 5/14532 |
| 10,039,881 B2 * | 8/2018 | Sloan | A61B 5/14532 |
| 10,090,858 B2 * | 10/2018 | Cho | H03M 13/2906 |
| 10,561,349 B2 * | 2/2020 | Wedekind | A61B 5/14532 |
| 11,205,511 B2 * | 12/2021 | Hayter | G16H 40/63 |
| 2005/0138451 A1 * | 6/2005 | Simpson | H04W 52/0225 713/320 |
| 2005/0157759 A1 * | 7/2005 | Ohno | H04L 1/0083 370/535 |
| 2006/0004300 A1 | 1/2006 | Kennedy | |
| 2007/0096881 A1 | 5/2007 | Pillai | |
| 2008/0009692 A1 | 1/2008 | Stafford | |
| 2009/0296742 A1 * | 12/2009 | Sicurello | A61B 5/0004 370/527 |
| 2010/0277342 A1 | 11/2010 | Sicurello et al. | |
| 2010/0315225 A1 * | 12/2010 | Teague | H04W 4/38 340/539.12 |
| 2011/0193704 A1 | 8/2011 | Harper et al. | |
| 2011/0213225 A1 | 9/2011 | Bernstein et al. | |
| 2011/0319729 A1 | 12/2011 | Donnay et al. | |
| 2012/0151093 A1 | 6/2012 | Zheng | |
| 2014/0081107 A1 | 3/2014 | Cole et al. | |
| 2014/0121477 A1 | 5/2014 | Jin et al. | |
| 2014/0148659 A1 | 5/2014 | Sloan et al. | |
| 2015/0018643 A1 * | 1/2015 | Cole | A61B 5/14532 600/316 |
| 2015/0025345 A1 | 1/2015 | Funderburk et al. | |
| 2015/0038818 A1 | 2/2015 | Cole et al. | |
| 2015/0079907 A1 * | 3/2015 | Engelien-Lopes | H04W 4/80 455/41.2 |
| 2015/0173661 A1 | 6/2015 | Myles | |
| 2015/0320315 A1 * | 11/2015 | Sicurello | A61B 5/1468 340/870.07 |
| 2015/0341438 A1 | 11/2015 | Sloan et al. | |
| 2016/0174913 A1 | 6/2016 | Somanath et al. | |
| 2016/0331232 A1 * | 11/2016 | Love | A61B 5/14532 |
| 2017/0072264 A1 | 3/2017 | Hoffman et al. | |
| 2018/0172664 A1 | 6/2018 | Love et al. | |
| 2018/0182491 A1 * | 6/2018 | Belliveau | A43B 3/34 |
| 2018/0309540 A1 | 10/2018 | Sicurello et al. | |
| 2019/0000360 A1 | 1/2019 | Cole et al. | |
| 2019/0246357 A1 | 8/2019 | Cole et al. | |
| 2019/0369083 A1 | 12/2019 | Love et al. | |

FOREIGN PATENT DOCUMENTS

| | | | | |
|---|---|---|---|---|
| EP | 2419948.8 | | 12/2025 | |
| JP | 2011097388 A | * | 5/2011 | |
| JP | 2017-142655 A | | 8/2017 | |
| JP | 2019186756 A | * | 10/2019 | |
| JP | 2025029034 A | * | 3/2025 | ............ H04W 4/80 |
| WO | WO 2014/145049 A2 | | 9/2014 | |
| WO | WO 2014/206382 A1 | | 12/2014 | |

OTHER PUBLICATIONS

JP2011097388A Translation (Year: 2011).*
WO, PCT/US20/28812 ISR and Written Opinion, Aug. 19, 2020.
EP, 20791308.8 Extended Search Report, Oct. 21, 2022.
CA, 3,137,140 Exmaniner's Report, Mar. 10, 2023.
Gu, W., et al., "Null Data Frame: A Double-Edged Sword in IEEE 802.11 WLANs", IEEE Transaction on Parallel and Distributed Systems, 2010, vol. 21, No. 7, pp. 897-910.
IEEE Standard for Information Technology—Local and Metropolitan Area Networks—Specific Requirements, Part 11: Wireless LAN MAC and PHY Specifications, 2020, pp. 1-4379.
CN, 202080044005.8 First Office Action, Sep. 29, 2023.
CN, 202080044005.8 Second Office Action, Apr. 18, 2024.
JP, 2021-560956 Office Action, Feb. 28, 2024.
CN, 202080044005.8 Third Office Action, Jul. 22, 2024.
JP, 2021-560956 Office Action, Aug. 7, 2024.
AU, 2020257427 First Examination Report, Jan. 25, 2025.
EP, 24199148.8 Extended Search Report, Jan. 30, 2025.
MX, MX/a/2021/012625 Office Action, Sep. 3, 2024.

* cited by examiner

SYSTEMS, DEVICES, AND METHODS FOR HANDLING WIRELESS COMMUNICATIONS IN AN ANALYTE MONITORING ENVIRONMENT

CROSS-REFERENCE TO RELATED APPLICATIONS

This application claims priority to and the benefit of U.S. Provisional Application No. 62/836,059, filed Apr. 18, 2019, which is incorporated by reference herein in its entirety and for all purposes.

FIELD

The present subject matter generally relates to systems, devices, and methods for maintaining compliance with timing requirements of communication protocols.

BACKGROUND

The detection and/or monitoring of analyte levels, such as glucose, ketones, lactate, oxygen, hemoglobin A1C, or the like, can be vitally important to the health of an individual having diabetes. Diabetics generally monitor their glucose levels to ensure that they are being maintained within a clinically safe range, and may also use this information to determine if and/or when insulin is needed to reduce glucose levels in their bodies or when additional glucose is needed to raise the level of glucose in their bodies.

Growing clinical data demonstrates a strong correlation between the frequency of glucose monitoring and glycemic control. Despite such correlation, many individuals diagnosed with a diabetic condition do not monitor their glucose levels as frequently as they should due to a combination of factors including convenience, testing discretion, pain associated with glucose testing, and cost.

Analyte monitoring systems have been developed that assist individuals to more frequently monitor their glucose and/or other analyte levels. These systems typically utilize a device that resides in or on the patient's body and have a sensor that measures the patient's glucose levels continuously or repeatedly over the course of the sensor's lifetime. This device can communicate the measured information wirelessly to another device, typically a smart device, computing device, or other type of glucose information reader. The wireless communication adds to the convenience and user-friendly nature of the system. However, challenges can arise when the wireless communication is performed according to a protocol that has timing requirements that do not take into account the processing and other delays that may be present in the analyte monitoring system.

For these and other reasons, needs exist for analyte monitoring systems, devices, and methods capable of maintaining compliance with wireless protocol requirements.

SUMMARY

Example embodiments of systems, devices, and methods are described herein for communication in an analyte monitoring system in accordance with an applicable communication protocol. In many embodiments, a first device of the system may transmit a command to a second device of the system and the second device may encounter a processing delay in preparing data responsive to the command. In these or other cases the second device may transmit dummy data to the first device in order to maintain compliance with the communication protocol until such time that the second device is ready to transmit data responsive to the command. Numerous different embodiments for incorporating and/or accommodating the presence of dummy data in a communication hierarchy are provided.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1:
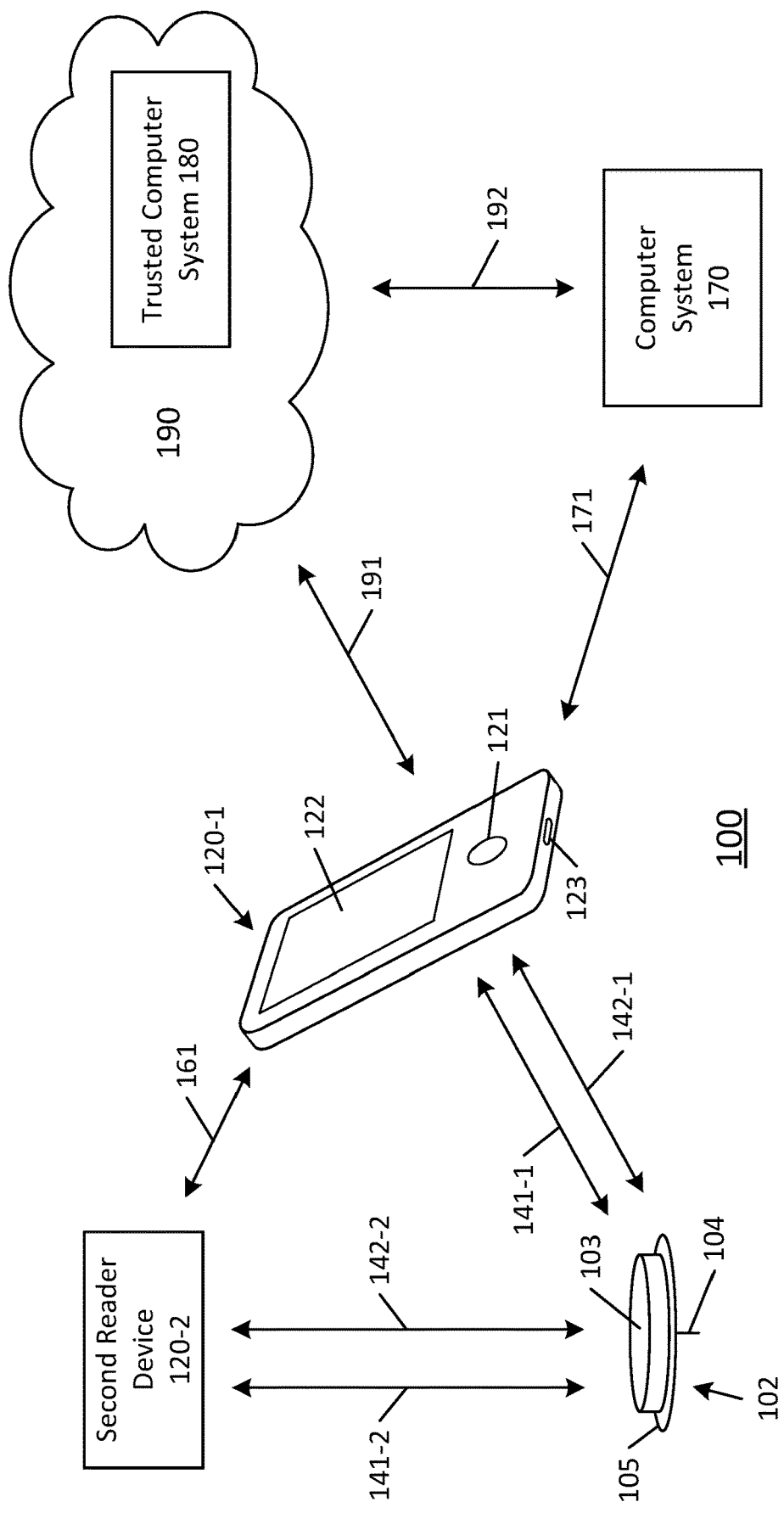
FIG. 1 is a block diagram depicting an example embodiment of an in vivo analyte monitoring system.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Generally, embodiments of the present disclosure are used with systems, devices, and methods for detecting at least one analyte, such as glucose, in a bodily fluid (e.g., subcutaneously within the interstitial fluid ("ISF") or blood, within the dermal fluid of the dermal layer, or otherwise). Accordingly, many embodiments include in vivo analyte sensors structurally configured so that at least a portion of the sensor is, or can be, positioned in the body of a user to obtain information about at least one analyte of the body. However, the embodiments disclosed herein can be used with in vivo analyte monitoring systems that incorporate in vitro capability, as well as purely in vitro or ex vivo analyte monitoring systems, including those systems that are entirely non-invasive.

Furthermore, the embodiments described herein can be used with devices that sense biometrics other than analyte data, such as heart rate, blood pressure, body temperature, perspiration, intraocular pressure, and others. The embodiments described herein can be used with devices that sense movement and/or activity level alone or in combination with any other metric. The embodiments described herein are thus not limited to medical applications and can be used with other, non-medical systems, where RF communication between devices is employed.

Before describing the embodiments in detail, however, it is first desirable to describe examples of devices that can be present within, for example, an in vivo analyte monitoring system, as well as examples of their operation, all of which can be used with the embodiments described herein.

Example Embodiments of Analyte Monitoring Systems

In vivo monitoring systems can include a sensor that, while positioned in vivo, makes contact with the bodily fluid of the user and senses the analyte levels contained therein. The sensor can be part of a OBD that resides on the body of the user and contains the electronics and power supply that enable and control the analyte sensing. The on body device, and variations thereof, can also be referred to as a "sensor device," an "on-body electronics device," a "sensor control device," or a "sensor communication device," to name a few. As used herein, these terms are not limited to devices with in vivo analyte sensors, and encompass devices that have ex vivo sensors of other types, whether biometric (e.g., photonic analyte sensors, heart rate sensors, temperature sensors, etc.) or non-biometric. The term "on body" encompasses devices that reside directly on the body (e.g., attached to the skin), are wholly within the body (e.g., a fully implanted device), or are in close proximity to the body, such as a wearable device (e.g., glasses, watch, wristband or bracelet, neckband or necklace, etc.) or a device in a pocket, etc.

In vivo monitoring systems can also include one or more reader devices that read information about a sensed level from the on body device. These reader devices can process and/or display the sensed analyte information, in any number of forms, to the user. These devices, and variations thereof, can be referred to as "handheld reader devices," "readers," "handheld electronics" (or handhelds), "portable data processing" devices or units, "information receivers," "receiver" devices or units (or simply receivers), "relay" devices or units, or "remote" devices or units, to name a few.

In vivo analyte monitoring systems can be differentiated from "in vitro" systems that contact a biological sample outside of the body, and "ex vivo" systems that gain information about the body or a substance within the body but that do so while remaining wholly outside the body without extracting a biological sample from inside the body. In vitro systems can include a meter device that has a port for receiving an analyte test strip carrying a bodily fluid of the user, which can be analyzed to determine the user's analyte level. As mentioned, the embodiments described herein can be used with in vivo systems, ex vivo systems, in vitro systems, and combinations thereof.

The embodiments described herein can be used to monitor and/or process information regarding any number of one or more different analytes. Analytes that may be monitored include, but are not limited to, acetyl choline, amylase, bilirubin, cholesterol, chorionic gonadotropin, glycosylated hemoglobin (HbAlc), creatine kinase (e.g., CK-MB), creatine, creatinine, DNA, fructosamine, glucose, glucose derivatives, glutamine, growth hormones, hormones, ketones, ketone bodies, lactate, peroxide, prostate-specific antigen, prothrombin, RNA, thyroid stimulating hormone, and troponin. The concentration of drugs, such as, for example, antibiotics (e.g., gentamicin, vancomycin, and the like), digitoxin, digoxin, drugs of abuse, theophylline, and warfarin, may also be monitored. In embodiments that monitor more than one analyte, the analytes may be monitored at the same or different times Example embodiments of in vivo analyte monitoring systems can include one or more on body devices, one or more reader devices, and one or more computer systems capable of communicating in a highly interconnected fashion. FIG. 1 is an illustrative and block diagram depicting an example embodiment of an in vivo analyte monitoring system 100 having an on body device (OBD) 102, a first reader device 120-1, a second reader device 120-2, a local or remote computer system 170, and a trusted computer system 180 (e.g., a server), each of which can be configured to communicate over a communications network 190. References to reader device 120 herein refer to both reader device 120-1 and 120-2.

OBD 102 can communicate with reader device 120 over two or more wireless communication paths, links, or channels 141 and 142, which can be uni-directional or bi-directional. Links 141 and 142 are formed by communication circuitry and one or more antennas present in OBD 102 and reader device 120. In some embodiments, the capability for devices 102 and 120 to communicate over an additional wired communication path, such as a universal serial bus (USB) cable (not shown), can be implemented.

Wireless communication link 141 can have various implementations. In some embodiments, communication link 141 uses near field electromagnetic induction to communicate. Such links are sometimes referred to as close proximity communications as they require the transmitting and receiving devices to be in relatively close proximity as compared to far field (or transition zone) communications. Communication using electromagnetic induction generally occurs within a two wavelength distance, more typically within one wavelength distance between the transmitting and receiving devices. In many embodiments, electromagnetic induction-based communications occur only within one foot (12 inches) of range or shorter, dependent upon frequency and power of transmission, among others. Examples include "Near Field Communication" (NFC) protocols, which refer to a number of protocols (or standards) that set forth operating parameters, modulation schemes, coding, transfer speeds, frame format, and command definitions for NFC devices. Some examples of NFC devices operate at 13.56 Megahertz (Mhz). The following is a non-exhaustive list of examples of these protocols: ECMA-340, ECMA-352, ISO/IEC 14443, ISO/IEC 15693, ISO/IEC 18000-3, ISO/IEC 18092, and ISO/IEC 21481, all of which are incorporated by reference herein in their entirety and for all purposes. Examples also include Radio Frequency Identification (RFID) protocols.

Responsive communications using electromagnetic induction can be passively generated, where power conveyed by a transmission from a first device is captured by the receiving second device and used to power transmission of a response by the second device back to the first device. Responsive communications using electromagnetic induction can be actively generated, such that the receiving second device uses power from its own power source alone, or in combination with power captured from the received transmission, to power transmission of the responsive communication back to the first device.

The sending of a transmission, e.g., a request for analyte data, from reader device 120 to OBD 102 can cause OBD 102 to respond with a transmission of its own, e.g., analyte data obtained or derived from a measurement made by sensor 104. This process of transmitting from reader 120 to OBD 102 and receiving a response from OBD 102 can be referred to as "scanning" or conducting a "scan" of OBD 102. In many embodiments, OBD 102 is configured as a passive device where the power from a transmission from reader device 120 received over link 141 is captured and used to power transmission of the responsive communication from OBD 102 back to reader device 120. This can be referred to as a "passive scan." In such embodiments, OBD 102 can power transmissions without using power from a power source (e.g., a coin cell battery) internal to OBD 102. In other embodiments, OBD 102 can be configured as an active device where the power from a transmission from reader device 120 received over link 141 is or is not captured, and the power used to transmit the responsive communication from OBD 102 back to reader device 120 is generated entirely or in part by the power source internal to OBD 102. This can be referred to as an "active scan."

Wireless communication link 142 utilizes communication protocols other than those used by link 141 and relies primarily on the longer range far field characteristics of electromagnetic transmission, where transmission does not occur only through inductive coupling. Link 142 can communicate over the same close proximity communication range as link 141 and substantially farther. Link 142 can also have various implementations. To form link 142, OBD 102 and reader 120 can include communication circuitry and one or more antennas configured to communicate over standardized or proprietary protocols and formats. For example, link 142 can be formed using a Bluetooth (e.g., traditional Bluetooth or Bluetooth Low Energy (BLE)) frequency and protocol. Link 142 can also be formed in other frequency bands and using other protocols, such as an ultra-high frequency (UHF) band (for example, between 450-470 Megahertz) and proprietary protocol, a Wi-Fi protocol in various frequencies, other proprietary protocol, or the like, including those communication protocols in existence as of the date of this filing or their later developed variants. While both links 141 and 142 can utilize various protocols and frequencies, for ease of differentiation they can be referred to herein as NFC link 141 and Bluetooth (BT) link 142. In some embodiments, NFC link 141 is used to initiate and activate the on body device 102, while analyte data is communicated only over BT link 142.

OBD 102 can be configured to communicate with multiple reader devices 120 over different instances of links 141 and 142. This is shown in FIG. 1 by the presence of first reader device 120-1 capable of communication with OBD 102 over NFC link 141-1 and BT link 142-1, and by the presence of second reader device 120-2 capable of communication with OBD 102 over NFC link 141-2 and BT link 142-2. Additional reader devices 120 can also be present.

Reader device 120 can communicate with multiple OBDs 102. For example, each reader device 120 can communicate with a first OBD 102 on the body of a user over the first OBD's operating lifetime, and then that OBD 102 can be discarded and replaced with a second OBD 102 on the body of the user, which the same reader device 120 can again communicate with. In some embodiments, a particular reader device 120 can communicate with multiple OBDs concurrently, located on the same or different users.

Reader device 120 is also capable of wired, wireless, or combined communication with other devices. FIG. 1 depicts reader device 120-1 in communication with computer system 170 (e.g., a local or remote computer system) over communication link, path, or channel 171, and also in communication with a network 190, such as the internet or the cloud, over communication link, path, or channel 191. (Reader device 120-2 can also communicate with these devices in like fashion, but those connections are not shown for ease of illustration.) Reader device 120-1 can communicate with a trusted computer system 180 by way of network 190 using link 191. Trusted computer system 180 can communicate with computer system 170 over communication link, path, or channel 192. For example, trusted computer system 180 can be a server that serves analyte analytics software to reader device 120-1 and/or computer system 170, for example, in the form of a downloadable software application or "app" or as an internet browser accessible web page.

Communication links 171, 191, and 192 can be wireless, wired, or both, can be uni-directional or bi-directional, and can be part of a telecommunications network, such as a Wi-Fi network, a local area network (LAN), a wide area network (WAN), the internet, or other data network. In some cases, communication paths 171 and 172 can be, at least in part, the same path (e.g., such as when communicating over Wi-Fi). All communications over the various paths can be encrypted and OBD 102, reader device 120-1, reader device 120-2, computer system 170, and trusted computer system 180 can each be configured to encrypt and decrypt those communications sent and received.

Variants of devices 102 and 120, as well as other components of an in vivo-based analyte monitoring system that are suitable for use with the system, device, and method embodiments set forth herein, are described in U.S. Publ. No. 2011/0213225 (the '225 Publication), which is incorporated by reference herein in its entirety for all purposes.

Referring again to FIG. 1, OBD 102 can include a housing 103 containing analyte monitoring circuitry and a power source. In this embodiment, the analyte monitoring circuitry is electrically coupled with an analyte sensor 104 that extends through an adhesive patch 105 and projects away from housing 103. Adhesive patch 105 contains at least one adhesive layer (not shown) for attachment to a skin surface of the body of the user, and optionally a second adhesive layer on the opposite surface for attachment to housing 103. Other forms of attachment to the body and/or housing 103 may be used, in addition to or instead of adhesive.

Analyte sensor 104 is adapted to be at least partially inserted into the body of the user, where it can make fluid contact with that user's bodily fluid (e.g., ISF, dermal fluid, or blood) and be used, along with the analyte monitoring circuitry, to measure analyte-related data of the user. Sensor 104 and any accompanying sensor electronics can be applied to the body in any desired manner. For example, an insertion device (not shown) can be used to position all or a portion of analyte sensor 104 through an external surface of the user's skin and into contact with the user's bodily fluid. In doing so, the insertion device can also position OBD 102 with adhesive patch 105 onto the skin. In other embodiments, the insertion device can position sensor 104 first, and then accompanying electronics (e.g., wireless transmission circuitry and/or data processing circuitry, and the like) can be coupled with sensor 104 afterwards, either manually or with the aid of a mechanical device. Examples of insertion devices are described in U.S. Publ. Nos. 2008/0009692, 2011/0319729, 2015/0018639, 2015/0025345, and 2015/0173661, all which are incorporated by reference herein in their entireties and for all purposes.

After collecting raw analog data from the user's body, OBD 102 can optionally apply analog signal conditioning to the data and convert the analog data into a digital form of the conditioned raw data. In some embodiments, this digital raw data can be encoded for transmission to another device, e.g., reader device 120, which then algorithmically processes that digital raw data into a final form representative of the user's measured biometric (e.g., a form readily made suitable for display to the user). This algorithmically processed data can then be formatted or graphically processed for digital display to the user. In other embodiments, OBD 102 itself can algorithmically process the digital raw data into the final form that is representative of the user's measured biometric (e.g., analyte level) and then encode and wirelessly communicate that data to reader device 120, which in turn can format or graphically process the received data for digital display to the user. In other embodiments, OBD 102 can graphically process the final form of the data such that it is ready for display, and display that data on a display of OBD 102 or transmit the data to reader device 120. In some embodiments, the final form of the biometric data (prior to graphic processing) is used by the system (e.g., incorporated into a diabetes monitoring regime) without processing for display to the user. In some embodiments, OBD 102 and reader device 120 transmit the digital raw data to another computer system for algorithmic processing and display. The transmissions of these various forms of data can occur over either or both of links 141 and 142.

Each reader device 120 within system 100 can include a display 122 to output information to the user and/or to accept an input from the user, and an optional input component 121 (or more), such as a button, actuator, touch sensitive switch, capacitive switch, pressure sensitive switch, jog wheel or the like, to input data, commands, or otherwise control the operation of reader device 120. In certain embodiments, display 122 and input component 121 may be integrated into a single component, for example, where the display can detect the presence and location of a physical contact touch upon the display, such as a touch screen user interface. In certain embodiments, input component 121 of reader device 120 may include a microphone and reader device 120 may include software configured to analyze audio input received from the microphone, such that functions and operation of the reader device 120 may be controlled by voice commands. In certain embodiments, an output component of reader device 120 includes a speaker (not shown) for outputting information as audible signals. Similar voice responsive components such as a speaker, microphone and software routines to generate, process and store voice driven signals may be included in OBD 102.

Reader device 120 can also include one or more data communication ports 123 for wired data communication with external devices such as computer system 170 or OBD 102. Example data communication ports include all types of serial or parallel connectors, including all variants of USB ports, RS-232 ports, Ethernet ports, Firewire ports, or other similar data communication ports configured to connect to the compatible data cables. Reader device 120 may also include an integrated or attachable in vitro glucose meter, including an in vitro test strip port (not shown) to receive an in vitro glucose test strip for performing in vitro blood glucose measurements.

Reader device 120 can display the measured biometric data wirelessly received from OBD 102 and can also be configured to output alarms, alert notifications, glucose values, etc., which may be visual, audible, tactile, or any combination thereof. Further details and other display embodiments can be found in, e.g., U.S. Publ. No. 2011/0193704, which is incorporated herein by reference in its entirety for all purposes.

Reader device 120 can function as a data conduit or relay to transfer the measured data from OBD 102 to computer system 170 or trusted computer system 180. In certain embodiments, the data received from OBD 102 may be stored (permanently or temporarily) in one or more memories of reader device 120 prior to uploading to system 170, 180 or network 190.

Computer system 170 may be a personal computer, a server terminal, a laptop computer, a tablet, or other suitable data processing device. Computer system 170 can be (or include) software for data management and analysis and communication with the components in analyte monitoring system 100. Computer system 170 can be used by the user or a medical professional to display and/or analyze the biometric data measured by OBD 102. In some embodiments, OBD 102 can communicate the biometric data directly to computer system 170 without an intermediary such as reader device 120, or indirectly using an internet connection (also optionally without first sending to reader device 120). Operation and use of computer system 170 is further described in the '225 Publication incorporated herein. Analyte monitoring system 100 can also be configured to operate with a data processing module (not shown), also as described in the incorporated '225 Publication.

Trusted computer system 180 can be within the possession of the manufacturer or distributor of OBD 102, either physically or virtually through a secured connection, and can be used to perform authentication of OBD 102, for secure storage of the user's biometric data, and/or as a server that serves a data analytics program (e.g., accessible via a web browser) for performing analysis on the user's measured data.

Example Embodiments of Reader Devices

Reader device 120 can be a dedicated reader device that is custom manufactured for the purpose of interfacing with OBD 102. Reader device 120 can also be a mobile communication device such as a mobile telephone including, but not limited to, a Wi-Fi or internet enabled smart phone, tablet, or personal digital assistant (PDA). Reader device 120 can also be configured as a mobile smart wearable electronics assembly, such as a smart glass or smart glasses, or a smart watch or wristband.

Figure 2:
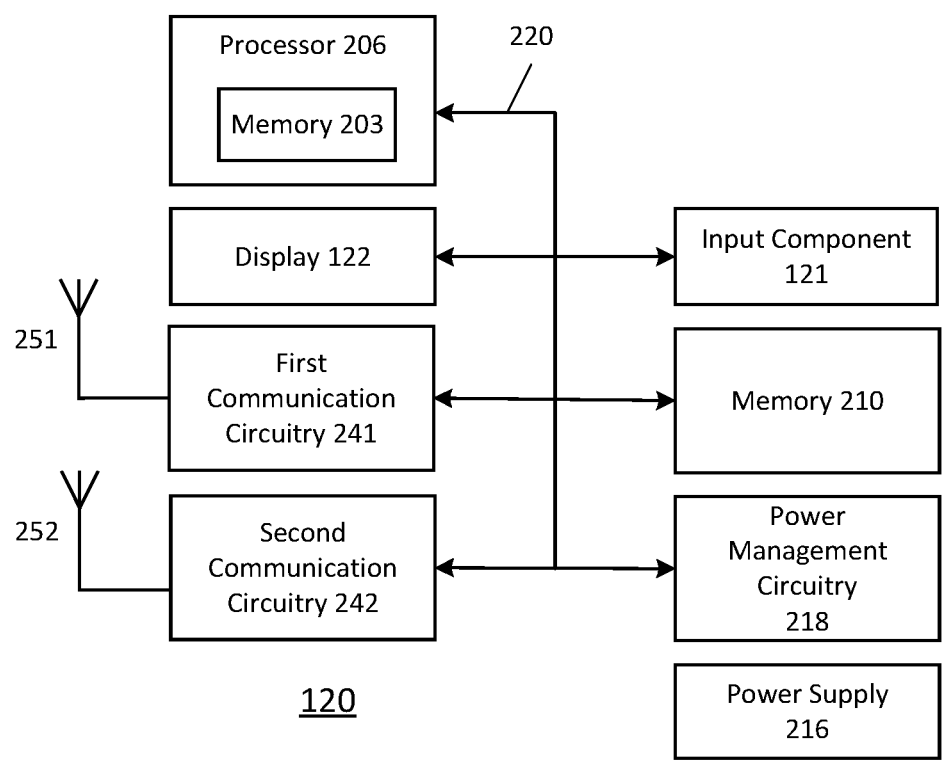
FIG. 2 is a block diagram depicting an example embodiment of a reader device.

FIG. 2 is a block diagram of an example embodiment of a reader device 120 (e.g., a dedicated reader, a smart phone, etc.). Here, reader device 120 includes input component 121, display 122, and processor or processing circuitry 206 with memory 203, first communication circuitry 241 coupled with a first antenna 251, second communication circuitry 242 coupled with an optional second antenna 252, a memory 210, a power supply 216, and power management circuitry 218.

Reader 120 can be implemented in a highly interconnected fashion, where power supply 216 is coupled with each component shown in FIG. 2 and where those components that communicate or receive data, information, or commands (e.g., processor 206, memory 203, memory 210, power management circuitry 218, input component 121, display 122, first communication circuitry 241, and second communication circuitry 242), can be communicatively coupled with every other such component over, for example, one or more communication connections or buses 220. FIG. 2 is an abbreviated representation of the typical hardware and functionality that resides within a dedicated reader and those of ordinary skill in the art will readily recognize that other hardware and functionality (e.g., codecs, drivers, glue logic, global positioning system (GPS) circuitry, a crystal oscillator, phase-locked loop (PLL), etc.) can also be included.

First communication circuitry 241 and antenna 251 are configured for communication (transmission and/or reception) over communication link 141, and second communication circuitry 242 and antenna 252 are configured for communication over communication link 142. In some embodiments, antenna 251 and antenna 252 can be a single shared antenna (e.g., capable of transmission and reception over NFC and BT frequencies). Communication circuitry 241 and 242 can be implemented as one or more chips and/or components (e.g., transmitter, receiver, transceiver, encoder, decoder, and/or other communication circuitry) that perform the functions for communications over the respective communications links 141 and 142.

Antennas 251 and 252 can be configured according to the needs of the application and communication protocol. Antennas 251 and 252 can have the same or different configuration and can be, for example, a printed circuit board (PCB) trace antenna, a ceramic antenna, or a discrete metallic antenna. Antennas 251 and 252 can be configured as a monopole antenna, a dipole antenna, an F-type antenna, a loop antenna, and others.

Processor 206 can include one or more processors, microprocessors, controllers, and/or microcontrollers, each of which can be a discrete chip or distributed amongst (and a portion of) a number of different chips. Here, processor 206 includes on-board memory 203. Processor 206 can interface with communication circuitry 241 and 242 and perform analog-to-digital conversions, encoding and decoding, digital signal processing and other functions that facilitate the conversion of data signals into a format (e.g., in-phase and quadrature) suitable for provision to communication circuitry 241 and 242, which can then transmit the signals wirelessly. Processor 206 can also interface with communication circuitry 241 and 242 to perform the reverse functions necessary to receive a wireless transmission and convert it into digital data or information.

Processor 206 can execute software instructions stored in memory 203 or 210. These instructions can cause processor 206 to cause communication circuitry 241 and 242 to transmit, can cause processor 206 to read and act on received transmissions, can cause processor 206 to read input from input component 121, to display data or information on display 122, to read input from display 122 when implemented as a touchscreen, to process data or information received from other devices (e.g., analyte data, calibration information, synchronization information received from OBD 102, and others), to perform tasks to maintain synchronization with OBD 102, and others.

Memory 210 can be shared by one or more of the various functional units present within reader device 120, or can be distributed amongst two or more of them (e.g., as separate memories present within different chips). Memory 210 can also be a separate chip of its own. Memories 203 and 210 are non-transitory, and can be volatile (e.g., RAM, etc.) and/or non-volatile memory (e.g., ROM, flash memory, F-RAM, etc.).

Power supply 216 can include one or more batteries, which can be rechargeable or single-use disposable batteries. Power management circuitry 218 can regulate battery charging and monitor usage of power supply 216, boost power, perform DC conversions, and the like.

Reader device 120 can also include or be integrated with a drug (e.g., insulin, etc.) delivery device such that they, e.g., share a common housing. Examples of such drug delivery devices can include medication pumps having a cannula that remains in the body to allow infusion over a multi-hour or multi-day period (e.g., wearable pumps for the delivery of basal and bolus insulin). Reader device 120, when combined with a medication pump, can include a reservoir to store the drug, a pump connectable to transfer tubing, and an infusion cannula. The pump can force the drug from the reservoir, through the tubing and into the diabetic's body by way of the cannula inserted therein. Other examples of drug delivery devices that can be included with (or integrated with) reader device 120 include portable injection devices that pierce the skin only for each delivery and are subsequently removed (e.g., insulin pens). A reader device 120, when combined with a portable injection device, can include an injection needle, a cartridge for carrying the drug, an interface for controlling the amount of drug to be delivered, and an actuator to cause injection to occur. The device can be used repeatedly until the drug is exhausted, at which point the combined device can be discarded, or the cartridge can be replaced with a new one, at which point the combined device can be reused repeatedly. The needle can be replaced after each injection.

The combined device can function as part of a closed-loop system (e.g., an artificial pancreas system requiring no user intervention to operate), semi-closed loop system (e.g., an insulin loop system requiring seldom user intervention to operate, such as to confirm changes in dose), or an open loop system. For example, the diabetic's analyte level can be monitored in a repeated automatic fashion by OBD 102, which can then communicate that monitored analyte level to reader device 120, and the appropriate drug dosage to control the diabetic's analyte level can be automatically determined and subsequently delivered to the diabetic's body. Software instructions for controlling the pump and the amount of insulin delivered can be stored in memory 203 and/or 210 of reader device 120 and executed by processing circuitry 206. These instructions can also cause calculation of drug delivery amounts and durations (e.g., a bolus infusion and/or a basal infusion profile) based on the analyte level measurements obtained directly or indirectly from OBD 102. In some embodiments OBD 102 can determine the drug dosage and communicate that to reader device 120.

Example Embodiments of on Body Devices

Figure 3A:
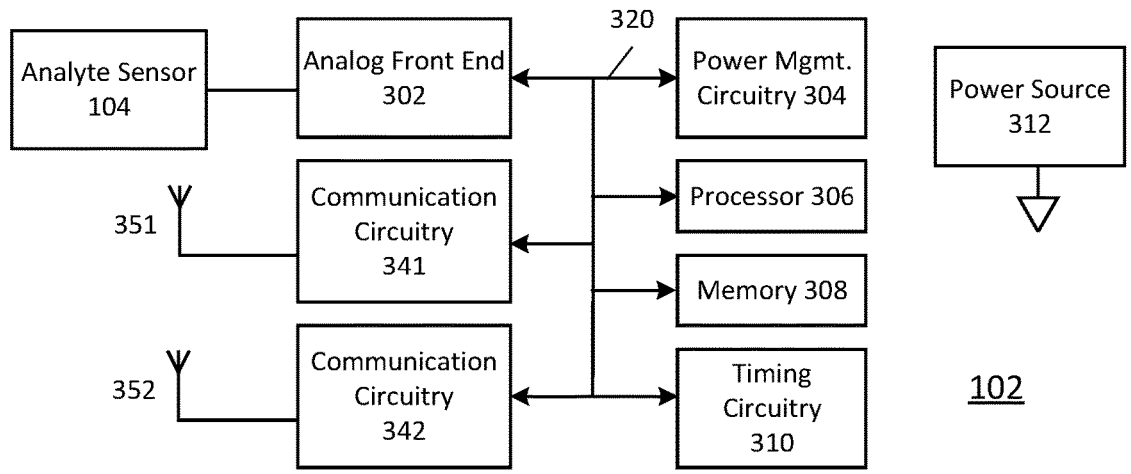
FIGS. 3A-3B are block diagrams depicting example embodiments of an on body device.

FIG. 3A is a block diagram depicting an example embodiment of OBD 102 having analyte sensor 104 and sensor electronics (including analyte monitoring circuitry). The sensor electronics can be implemented in one or more semiconductor chips, such as application specific integrated circuits (ASICs), off-the-shelf (OTS) chips, programmable devices (e.g., a PGA or FPGA, etc.), or others. OBD 102 includes certain high-level functional units, including an analog front end (AFE) 302, power management (or control) circuitry 304, processor or processing circuitry 306, memory 308, first communication circuitry 341, and second communication circuitry 342. In this embodiment, both AFE 302 and processor 306 are used as analyte monitoring circuitry, but in other embodiments either circuit (or others) can perform the analyte monitoring function.

OBD 102 can be implemented in a highly interconnected fashion, where power supply 312 is coupled with each component shown in FIG. 3A and where those components that communicate or receive data, information, or commands (e.g., AFE 302, power management circuitry 304, processor 306, memory 308, first communication circuitry 341, and second communication circuitry 342), can be communicatively coupled with every other such component over, for example, one or more communication connections or buses 320. FIG. 3A is an abbreviated representation of the typical hardware and functionality that resides within an OBD 102 and those of ordinary skill in the art will readily recognize that other hardware and functionality (e.g., codecs, drivers, glue logic, crystal oscillator, phase-locked loop (PLL)) can also be included.

Communication circuitry 341 and 342 can be coupled to antennas 351 and 352, respectively, which can be on chip or off chip (as shown here). First communication circuitry 341 and antenna 351 are configured for communication (transmission and/or reception) over communication link 141, and second communication circuitry 342 and antenna 352 are configured for communication over communication link 142. In some embodiments, antenna 351 and antenna 352 can be a single shared antenna (e.g., capable of transmission and reception over NFC and BT frequencies). Communication circuitry 341 and 342 can be implemented as one or more components (e.g., transmitter, receiver, transceiver, passive circuit, encoder, decoder, and/or other communication circuitry) that perform the functions for communications over the respective communications links 141 and 142.

Although not limited to such, in some embodiments, communication circuitry 341 is passive and only uses power harvested from a transmission received from a second device (e.g., reader 120) to generate and propagate a response transmission back to the second device (such as when link 141 is an NFC link). In these and other embodiments, communication circuitry 342 can be active and can use power from OBD power source 312 to generate and propagate a transmission to a second device. The active communication circuitry 342 permits OBD 102 to generate a transmission spontaneously and with prompting from another device (e.g., without first receiving a request, polling signal, timing signal, and the like from the second device).

Processor 306 can include one or more processors, microprocessors, controllers, and/or microcontrollers, each of which can be a discrete chip or distributed amongst (and a portion of) a number of different chips. Processor 306 can interface with communication circuitry 341 and 342 and perform analog-to-digital conversions, encoding and decoding, digital signal processing and other functions that facilitate the conversion of data signals into a format (e.g., in-phase and quadrature) suitable for provision to communication circuitry 341 and 342, which can then transmit the signals wirelessly. Processor 306 can also interface with communication circuitry 341 and 342 to perform the reverse functions necessary to receive a wireless transmission and convert it into digital data or information.

Processor 306 can execute software instructions stored in memory 308. These instructions can cause processor 306 to cause communication circuitry 341 and 342 to transmit a communication generated by processor 306, can cause processor 306 to read and act on received transmissions, to adjust the timing of timing circuitry 310, to collect temperature information from a temperature sensor, to record and/or process a measurement from analyte sensor 104, to monitor collected analyte data for actual or potential alarm conditions, to generate and cause the transmission of an alarm indication using communication circuitry 342, to process data or information received from other devices (e.g., reader 120), to perform tasks to maintain synchronization with reader 120, and others.

Memory 308 can be shared by the various components present within OBD 102, or can be distributed amongst two or more of them. Memory 308 can also be a separate chip. Memory 308 is non-transitory and can be volatile and/or non-volatile memory. OBD 102 can include an optional temperature (or other environmental factor) sensor (not shown) and power source 312, which can be a coin cell battery, or the like. AFE 302 interfaces with in vivo analyte sensor 104 and receives measurement data therefrom, converts to digital form and outputs to processor 306 which in turn can, in some embodiments, process in any of the manners described elsewhere herein. This data can then be provided to communication circuitry 341 and 342 for sending, by way of antennas 351 and 352, to reader device 120 (not shown), for example, where minimal further processing is needed by the resident software application to display the data. Antennas 351 and 352 can be configured according to the needs of the application and communication protocol. Antennas 351 and 352 can have the same or different configuration and can be, for example, a printed circuit board (PCB) trace antenna, a ceramic antenna, or a discrete metallic antenna. Antennas 351 and 352 can be configured as a monopole antenna, a dipole antenna, an F-type antenna, a loop antenna, and others.

Figure 3B:
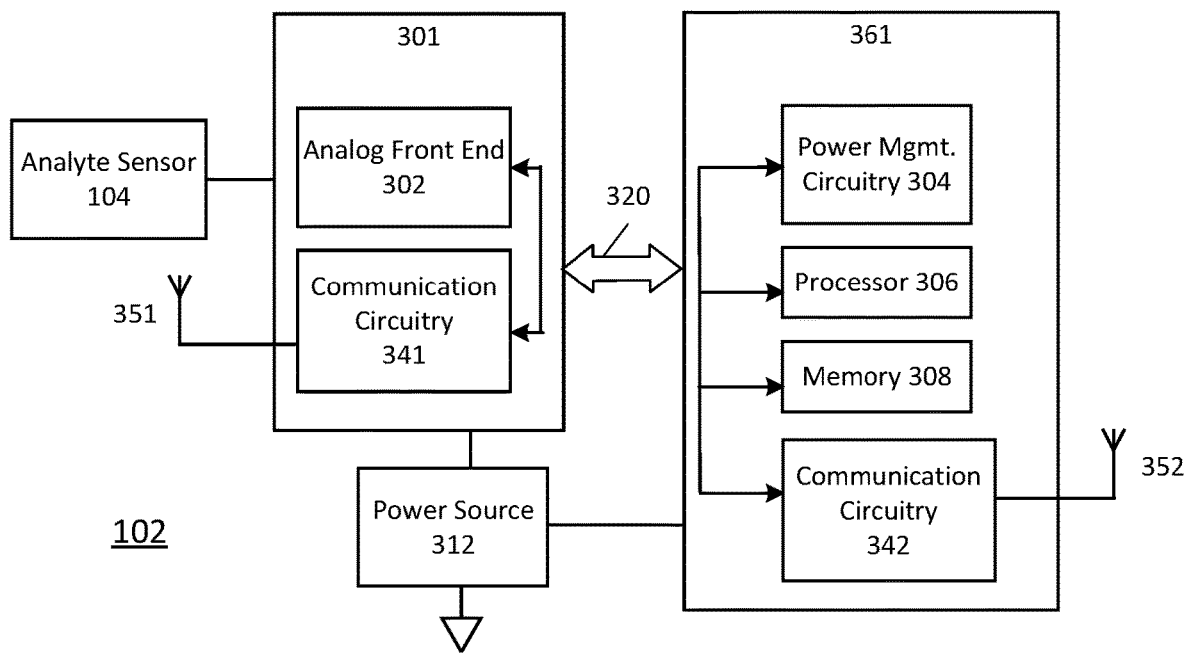

FIG. 3B is a block diagram depicting another example embodiment of OBD 102. Here, OBD 102 includes two semiconductor chips 301 and 361. Chip 301 is an ASIC including AFE 302 and communication circuitry 341 for NFC link 141. Chip 361 is a chip including processor 306, memory 308, communication circuitry 342 for BT link 142, and power management circuitry 304. Communication interface 320 can be configured in any manner desired. In one embodiment chip 361 is a Bluetooth or BLE radio chip and communication interface 320 is a serial interface, such as a serial peripheral interface (SPI). In other embodiments interface 320 is a parallel interface.

While FIGS. 3A and 3B depict embodiments of OBD 102 capable of forming multiple communication links 141 and 142, all the embodiments described herein can be practiced with implementations of OBD 102 capable of forming only one communication link.

Example Embodiments of Communication to Compensate for Processing Delay

Communications received by OBD 102 can include one or more commands for OBD 102 to take an action, such as to connect a power source to the internal circuitry or otherwise transition from a zero power or low-power state to a relatively higher power state, to activate sensor 104 (e.g., such as by applying a bias voltage to one or more electrodes), to perform an analyte data measurement, to read out data stored in memory 308 (e.g., measured analyte data, data identifying OBD 102 (e.g., software version, serial number, etc.)), to perform a diagnostic, to set up a Bluetooth pairing, or others. These commands can be initiated by the user or can be automatically transmitted by the sending device as part of a software routine. The command can be specified in the applicable standard, or can be a custom command that requires a custom response.

The received communication often requires transmission of a response back to reader 120. If the commands are sent over NFC link 141 than the sending device will be in close proximity to OBD 102. Otherwise the sending device will be in range of OBD 102. For ease of discussion, the sending device will be described herein as reader 120.

After receiving the one or more commands, OBD 102 will utilize its internal hardware, software, or a combination thereof to generate a response for transmission back to reader 120. In some embodiments OBD 102 can even communicate with other devices on or near the user's body, or even remote to the user, as part of the process to collect the information requisite to generate the response. The amount of time necessary for OBD 102 to generate the response is dependent on a number of factors such as the amount of processing required to generate the response, the speed of the hardware and/or software responsible for generating the response, the amount of data required for the response, and others.

Certain communication protocols have a timing constraint or requirement that allocates a finite amount of time for the receiving device to respond. These protocols can be industry-standard protocols or custom protocols. For example, in embodiments where communications transmitted over NFC link 141 is compliant with the ISO15693 standard, then those communications must be sent within the maximum amount of time allotted by the standard for the receiving device to respond. For example, a majority of the NFC commands, including the Read Multiple Block command, Reade Single Block command, custom commands and proprietary commands, must be responded to within a set time limit. In one example ISO15693 specifies the command be responded to within 323 microseconds (μs) from the time that the receiving device received the command. Other standards may set other time limits, or this ISO15693 standard may be revised to allocate a different time limit.

In certain scenarios OBD 102 may require more time than the set time limit to generate and send a response. This processing delay can result in violation of the set time limit, and noncompliance with the standard. This may present particular problems when reader 120 is a commercial smart phone, as the smart phone may treat this violation as an error or failure preventing communication from being completed.

Example embodiments disclosed here can compensate for this processing delay and maintain compliance by transmitting one or more responses including dummy data, which is data that is sent for the purpose of maintaining compliance but does not constitute data that is wholly or partly responsive to the command. This data can be a predetermined sequence of bits that is programmed into or otherwise recognizable by the reader as representing dummy data. This data can alternatively be pseudorandom data that is generated according to an algorithm or code that signifies dummy data, such that when the pseudorandom data is decoded by the reader it is recognized as such. In another embodiment, the data can be predetermined or random and its status as dummy data can be indicated by a flag located in, for example, a payload header, whereupon the reader 120 can discard the data after recognizing the presence of the flag.

Figure 4A:
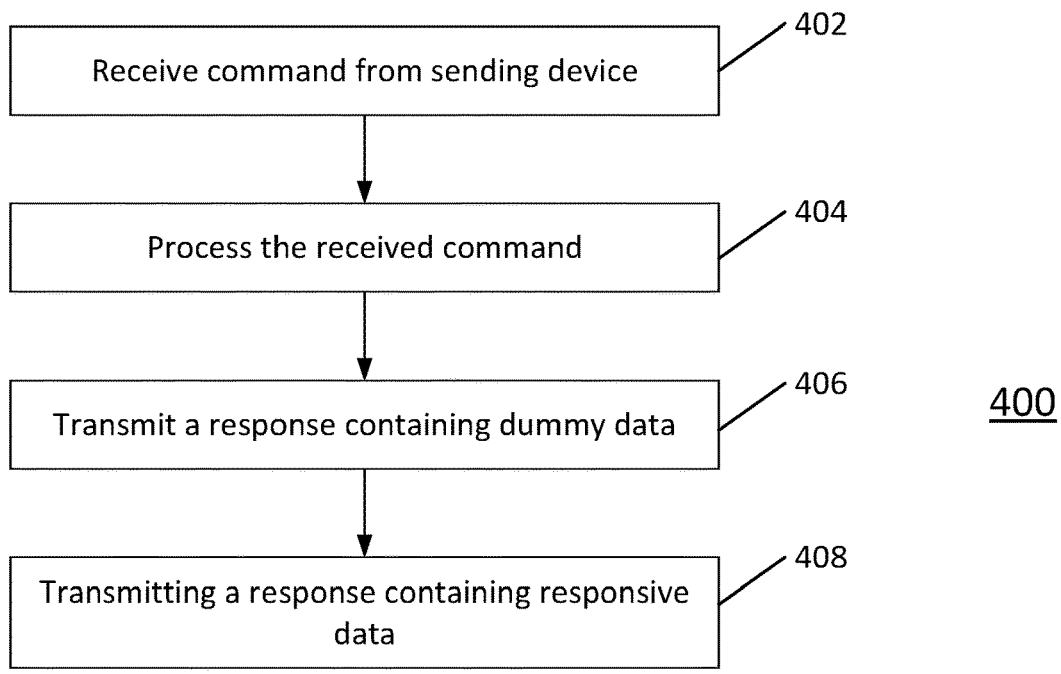
FIGS. 4A-4D are flow diagrams depicting example embodiments of methods of communication in an analyte monitoring system.

FIG. 4A is a flow diagram depicting an example embodiment of a method 400 of communication by a receiving device, which will be described here as OBD 102. At 402, OBD 102 receives a transmission including a command from a sending device, such as reader 120. At 404, OBD 102 processes the received command. This can include any steps necessary to decrypt, decode, and/or validate the received command, as well as any steps necessary to generate the information or data responsive to the command (the responsive data) for transmission back to reader 120. In this embodiment, it is assumed that step 404 requires more time than is allocated by the communication protocol to transmit the response back to reader 120. As such, at 406 OBD 102 transmits dummy data in a response to reader 120. This occurs prior to expiration of the set time limit for response so as to maintain compliance. The set time limit then resets and begins a new (second) time period for response. Prior to expiration of the second time period, OBD 102 transmits another response, which can include the responsive data if ready. If not ready, then OBD 102 can again transmit dummy data to reader 120, which again resets the set time limit in the process can repeat iteratively until the responsive data is ready for transmission. At 408, responsive data is transmitted back to reader 120 in one or more transmissions depending upon the size of the payload and constraints of the protocol etc. the completion of the response can be indicated by transmission of such an indication to reader 120, such as an end of frame (EOF) sequence.

Figure 4B:
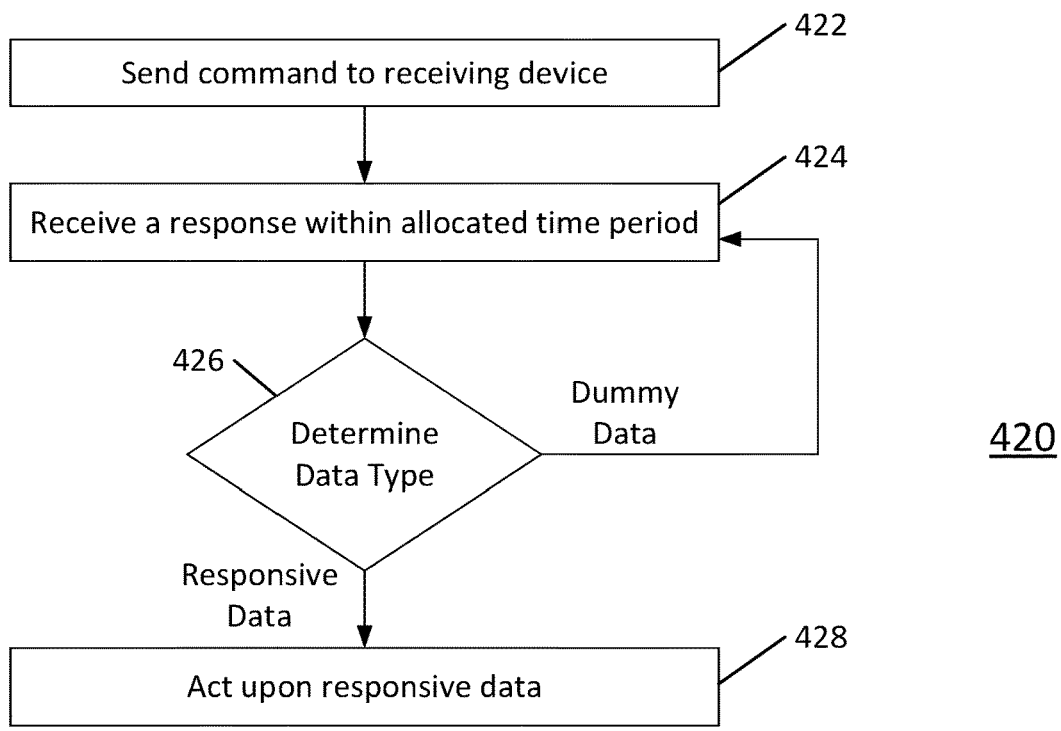

FIG. 4B is a flow diagram depicting an example embodiment of a method 420 of communication by the sending device, which will be described here as reader 120. At 422, reader 120 sends a command to OBD 102. At 424, reader 120 receives a response from OBD 102 within the time allocated by the protocol. At 426, reader 120 reads the received response and determines if it is dummy data or responsive data. In embodiments where the dummy data is a predetermined sequence or code (e.g., AAAA, FFFF, or others), then this determination can be made by comparing the received response to the known predetermined sequence or code to identify whether it matches and thus constitutes dummy data. If the received response does not match, and satisfies the other criteria for being valid data (such as satisfaction of a cyclic redundancy check, presence in the proper format, etc.), then the received response can be determined to be responsive data. In embodiments where the dummy data is indicated according to other techniques, such as generation according to a dummy data algorithm or indication as dummy data by a flag in the header, then reader 120 can apply that appropriate technique to verify whether or not the received response is dummy data or responsive data.

If the received response is responsive data then reader 120 acts upon it accordingly at 428. This can include storing the responsive data, displaying the responsive data to a user, communicating the responsive data to another device or any number of other actions apparent to those of ordinary skill in the art. If the received response is dummy data, then method 420 can return and wait for another response at step 424. The dummy data can be discarded or ignored by reader 120. The process of receiving a response at step 424 and determining whether the received response is dummy data or responsive data at 426 can repeat indefinitely until responsive data is received, and overall time period for completion of the sequential exchange of communications is reached, system 100 times out, or another event that terminates method 420 occurs.

Figure 4C:
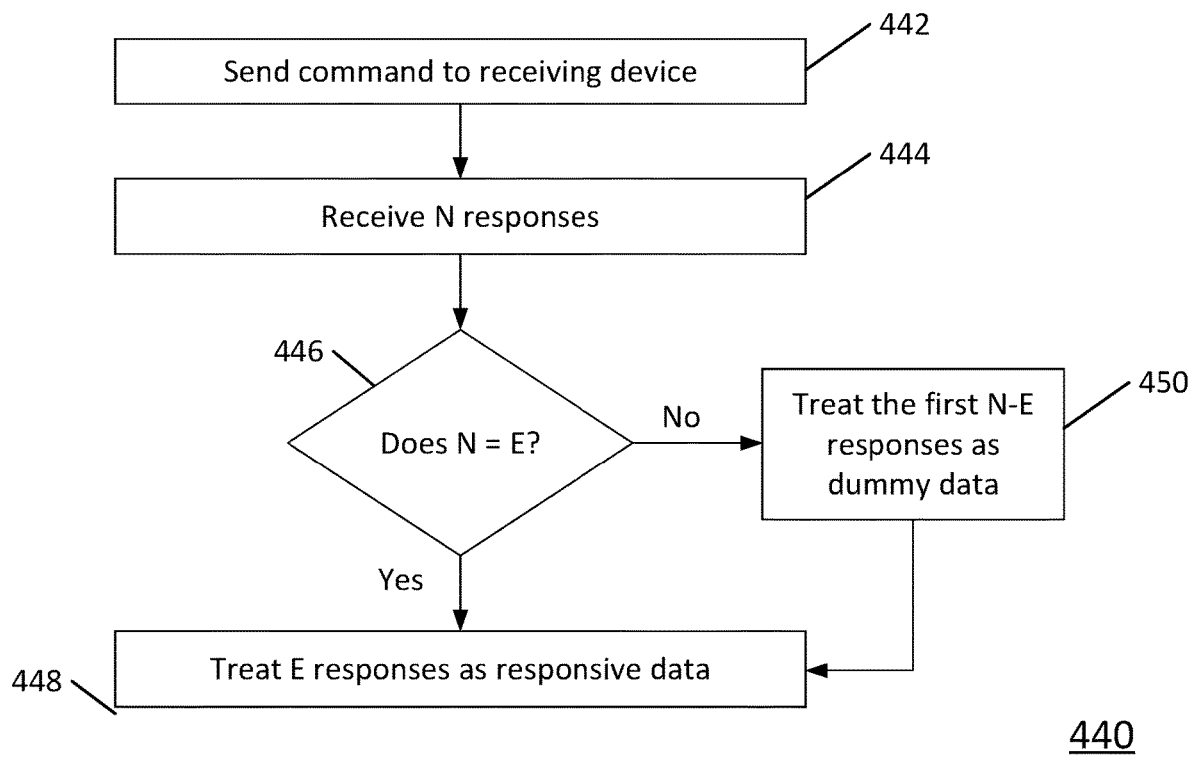

FIG. 4C is a flow diagram depicting another example embodiment of a method 440 of communication by the sending device, which will be described here as reader 120. At 442, reader 120 sends a command to OBD 102. At 444, reader 120 receives N sequential responses from OBD 102, each sequential response being within the time allocated by the protocol. For example, if the protocol sets the time limit as being one millisecond, then each sequential response is received within a millisecond of the prior response. In this embodiment, reader 120 does not independently determine whether every received response is dummy data or responsive data, but rather is programmed to recognize the proper number of responses that should be received in order to constitute a wholly responsive set of communications from OBD 102. For example, reader 120 can be programmed to recognize or expect that a certain command XYZ sent by reader 120 to OBD 102 should result in E individual responses received back from OBD 102, where E is greater than or equal to one. At 446, reader 120 determines if the number of received responses N is equal to the number of expected responses E. If so, then reader 120 can treat the E responses as being responsive data (assuming the responses satisfy all other validation criteria) and act accordingly at 448 (e.g., store the data, display the data, etc.).

If the number of received responses N is greater than the number of expected responses E, then reader 120 can treat the first N minus E (N−E) responses as being dummy data at 450. This can include ignoring or discarding the first N−E responses. This can also optionally include reading the first N−E responses and verifying that each is dummy data according to the dummy data criterion for the individual implementation, e.g., comparison to the known dummy data code, reference to a dummy data flag, etc. With E responses remaining, reader 120 can proceed to step 448 and treat the remaining E responses as responsive data, again assuming other validation criteria are satisfied, and act accordingly.

Figure 4D:
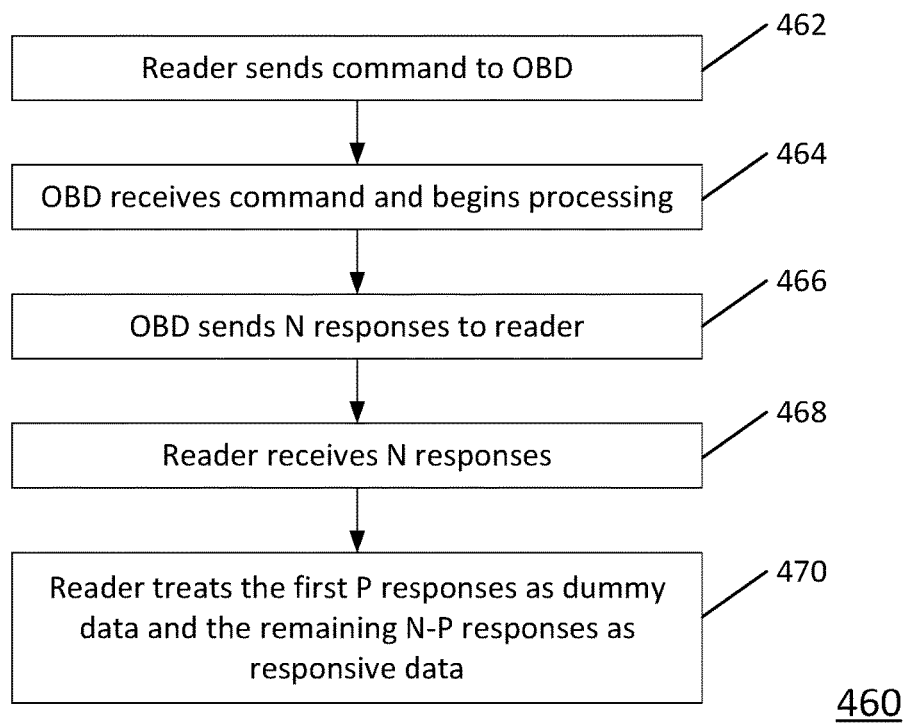

FIG. 4D is a flow diagram of another example embodiment of a method 460 of communication between a sending device and a receiving device, which will be described here as reader 120 and OBD 102, respectively. At 462, reader 120 sends a command to OBD 102, which receives it and begins processing it at 464. In this embodiment, OBD 102 is programmed to transmit a predetermined number (P) of dummy data responses back to reader 120 prior to transmitting the responsive data in the P+1th (and any subsequent) responses. The predetermined number of dummy data responses is determined based on the expected amount of time necessary for OBD to generate responsive data. This predetermined number can be determined and verified through testing during the system's development process. For example, if the set time period for responses one millisecond (ms), and it is determined that the maximum time necessary for OBD 102 to generate responsive data is 4.2 ms, then P can be preset to four and OBD 102 can be programmed to transmit four responses containing dummy data and began transmission of responsive data in the fifth response. Likewise, reader 120 can be programmed to expect four responses containing dummy data prior to receiving responsive data in the fifth response.

Referring to FIG. 4D, at 466 OBD 102 sends N responses to reader 120, which receives them at 468. At 470, reader 120 can treat the first P responses as dummy data and the remaining N minus P (N−P) responses as responsive data. This can include ignoring or discarding the first P responses. It can also optionally include reading the first P responses to verify they are dummy data. Reader 120 can read the P+1th response as being the first response containing responsive data, and continue through any remaining N−P responses. Assuming the responsive data meets the other validation criteria, then reader 120 can act upon it accordingly as described herein.

In some embodiments, system 100 can be configured such that different commands have different numbers of predetermined responses that are utilized, for example, based on different processing times for different commands. For example, a first command may correspond to three predetermined dummy data responses whereas a second command may correspond to four predetermined dummy data responses, and so forth. In these embodiments, both of the reader device and on body devices are preferably preprogrammed to know the proper number of predetermined responses to use for each command and the on body device can be programmed to read the received command and determine the appropriate number of predetermined responses to send for that command. Such configurations allow for more efficient use of communication bandwidth.

The embodiments described with respect to FIGS. 4A-4D are performed in systems where the time for processing the received command can exceed the time allocated for response by the protocol or standard. These embodiments can be utilized with any system that may encounter these extensive processing delays, regardless of the reason for the processing delay. The following embodiments are intended to serve as non-exhaustive examples of topologies or situations where the processing delay can exceed the allocated time, and many other examples are possible and within the scope of the subject matter described herein.

Referring back to the embodiment of FIG. 3B where link 141 is an NFC link, in certain examples some NFC communications received by communication circuitry 341 can be processed and responded to directly by ASIC 301, without interaction of chip 361. Some commands, however, may require a response generated by a more robust entity such as processor 306. In those instances, ASIC 301 can transfer the relevant portion of the received communication to chip 361 for generation of a response. Chip 361 can then generate the responsive data and, once available, output the responsive data back to ASIC 301 for transmission as one or more responses from OBD 102 over NFC link 141.

Reader 120 can be programmed or configured to recognize responses where the payload contains byte values (e.g., ABCD, FFFF) matching this predetermined payload as dummy data, and subsequently ignore those responses (e.g., not store in memory) and continue monitoring NFC link 141 for a response transmission including payload data other than the dummy data.

Figure 5A:
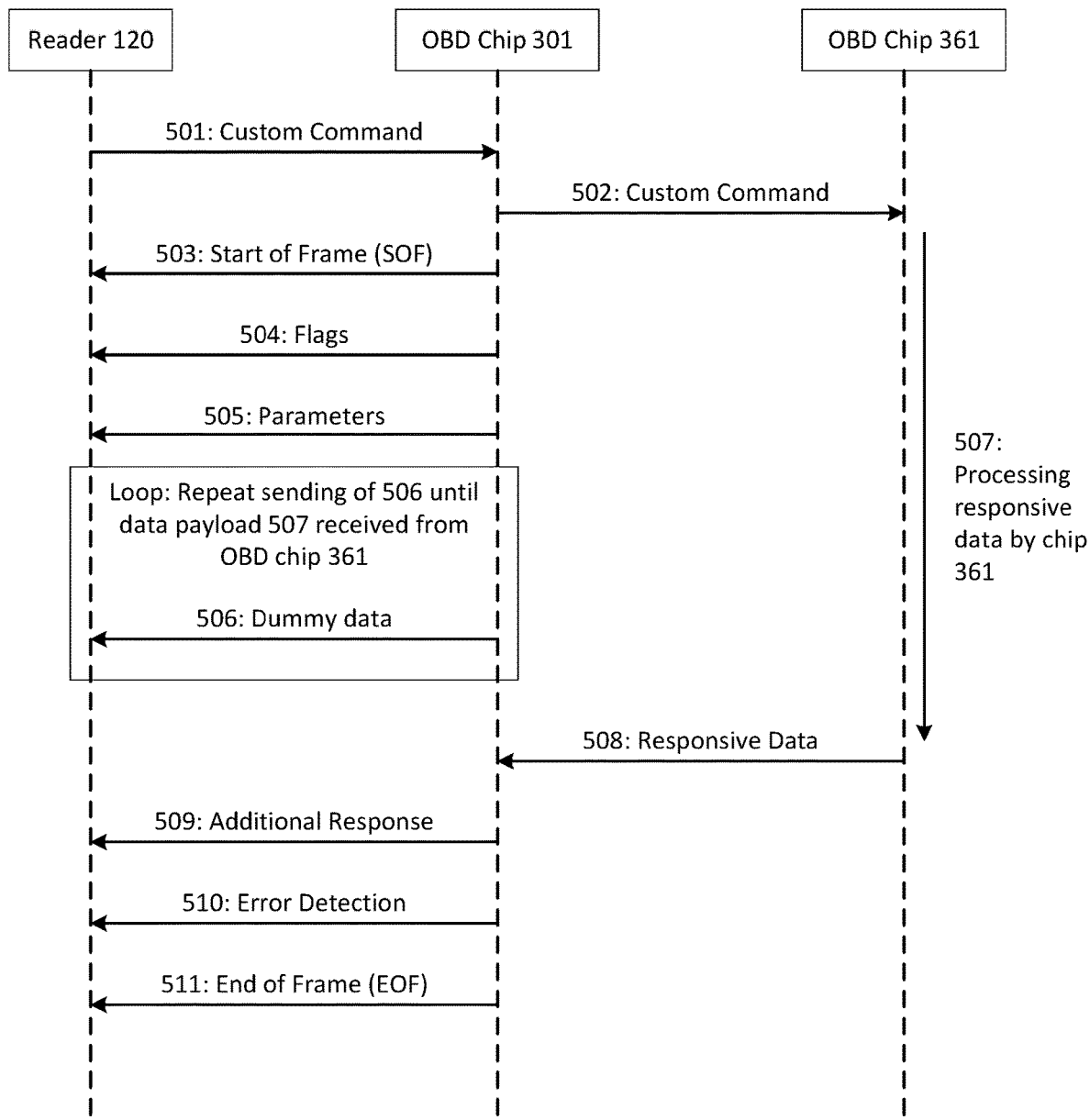
FIGS. 5A-5B are information flow diagrams depicting example embodiments of communication in an analyte monitoring system.

FIG. 5A is an information flow diagram depicting an example embodiment 500 for handling wireless communications to avoid violation of the set time limit for response. This embodiment 500 will be described in the context of an OBD 102 configured similar to FIG. 3B, although this embodiment 500 is not limited to such. The arrows in FIG. 5A depict wireless transmissions from reader 102 to chip 301 of OBD 102 and back to reader 102, as well as internal wired communication within OBD 102 from chip 301 to chip 361 and back that may, e.g., be communicated over interface 320 configured as an SPI.

At 501 a custom command is transmitted from reader device 120 and received at chip 301 of OBD 102. At 502, the received custom command (e.g., relevant portion thereof or information representative of the received command) is then transferred from chip 301 to chip 361 over interface 320. Chip 361 then reads the command and begins the process of generating and outputting the appropriate responsive data at 507. This may include the execution of algorithms, retrieval of data from memory, and/or other functions.

Concurrently, chip 301 prepares a response transmission, such as by using circuitry on chip 301 (e.g., ASIC circuitry). At 503 chip 301 causes transmission of a response including a start of frame (SOF) indication back to reader 120 over link 141. Also transmitted back to reader 120 are any flags (at 504) and/or other parameters (at 505) for the response packet header that can be readily determined with the set time limit for response transmission.

Assuming that chip 361 has not yet generated a response to the custom command with the expiration of the set time limit approaching, then at 506 chip 301 sends dummy data to reader 120. This process continues, where prior to the expiration of each subsequent set time limit a payload including dummy data is transmitted to reader 120. This loop can continue repeatedly until 508, when chip 361 outputs the response data payload to chip 301. Receipt of the response data payload is recognized by chip 301, which then causes this response data payload to be transmitted to reader 120 at 509 (utilizing as many sequential response packets as necessary and permitted to complete transmission). At 510 chip 301 transmits error detection bits (e.g., a cyclic redundancy check (CRC)) followed by an end of frame (EOF) indication at 511.

Figure 5B:
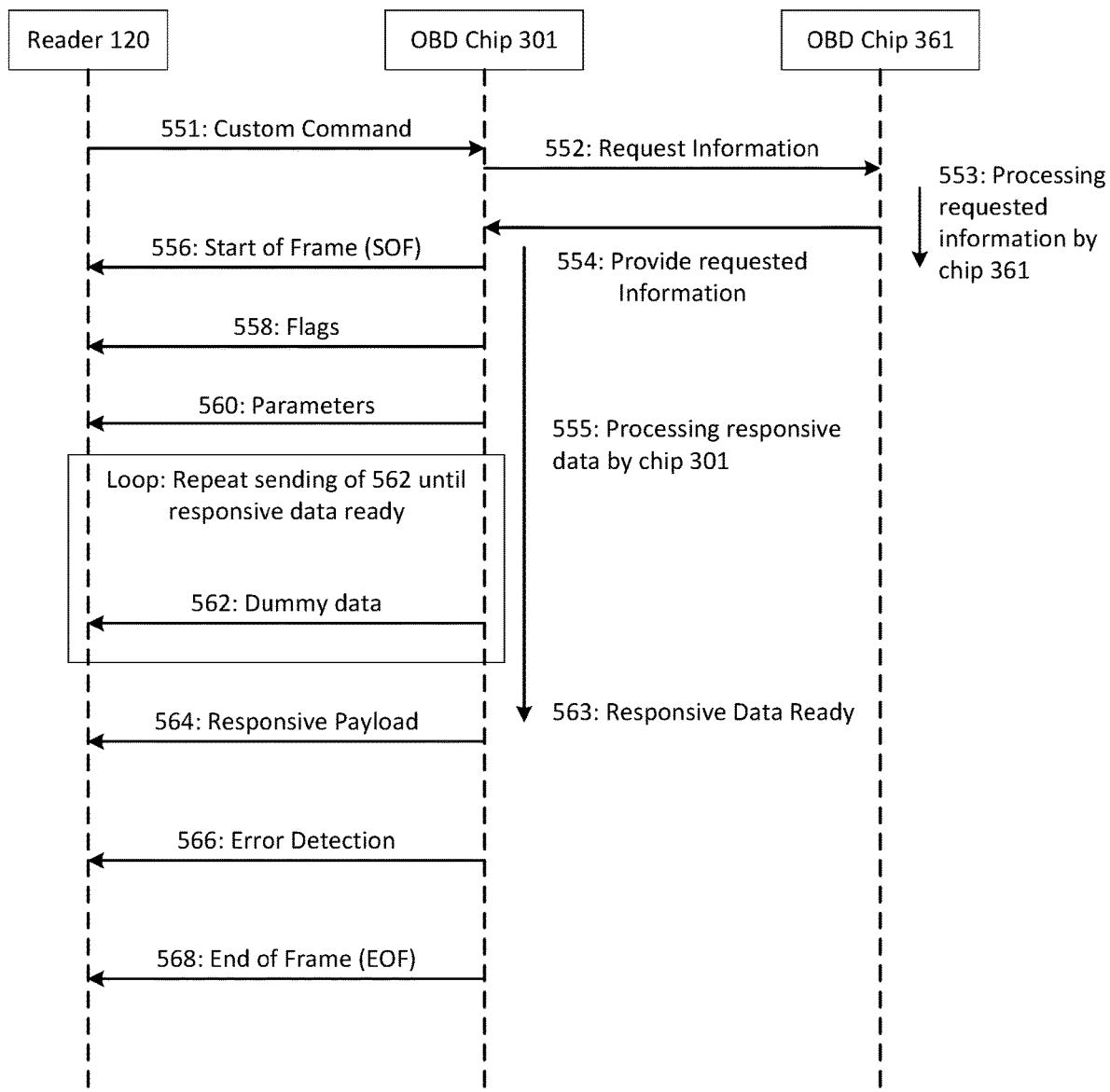

FIG. 5B is an information flow diagram depicting an example embodiment 550 for handling wireless communications to avoid violation of the set time limit for response. This embodiment 550 will be described in the context of an OBD 102 configured similar to FIG. 3B, although this embodiment 500 is not limited to such.

At 551 a custom command is transmitted from reader device 120 and received at chip 301 of OBD 102. At 552, chip 301 requests information necessary to formulate responsive data from chip 361. For example, the requested information may be a random number created by a random number generator in chip 361 for the purpose of encrypting the responsive data prior to transmission back to reader 120. At 553 chip 361 processes the requested information and at 554 chip 361 provides the requested information to chip 301. At 555 chip 301 receives the requested information from chip 361 and 556 chip 301 begins processing the responsive data. In other embodiments, the dummy data can be encrypted prior to transmission as well.

Concurrently, chip 301 prepares a response transmission, such as by using circuitry on chip 301 (e.g., ASIC circuitry). At 556 chip 301 causes transmission of a response including a start of frame (SOF) indication back to reader 120 over link 141. Also transmitted back to reader 120 are any flags (at 558) and/or other parameters (at 560) for the response packet header that can be readily determined with the set time limit for response transmission.

Assuming that chip 361 has not yet generated a response to the custom command with the expiration of the set time limit approaching, then at 562 chip 301 sends dummy data to reader 120. This process continues, where prior to the expiration of each subsequent set time limit a payload including dummy data is transmitted to reader 120. This loop can continue repeatedly until 563, when chip 301 completes processing (e.g., generation of responsive data and encryption of the same) and the responsive data is ready for transmission. Chip 301 then causes this responsive data payload to be transmitted to reader 120 at 564 (utilizing as many sequential responsive packet transmissions as necessary and permitted to complete transmission). At 566 chip 301 transmits error detection bits (e.g., a cyclic redundancy check (CRC)) followed by an end of frame (EOF) indication at 568.

In addition to the variance described above, in any and all embodiments described herein, responses containing dummy data can be responses that contain only dummy data within the payload portion of the response. This can be indicated by the sequence of bits contained within the payload corresponding to a predetermined code (e.g., AAAA, FFFF, ABCD, and others), or by a flag in the header section of the data frame that indicates that the data within the payload is dummy data or only dummy data.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In many embodiments, a method of communication in an analyte monitoring system including an on body device and a reader device is provided, the method including: wirelessly receiving, by the on body device, a command from the reader device; wirelessly transmitting at least one first response to the reader device, where the at least one first response includes dummy data; and wirelessly transmitting at least one second response to the reader device, where the at least one second response includes data responsive to the command.

In some embodiments, the method further includes processing the received command while transmitting the at least one first response to the reader device. Processing the received command can include: generating the data responsive to the command; and encrypting the data responsive to the command. The at least one second response transmitted to the reader device can include data responsive to the command in an encrypted form. The at least one first response transmitted to the reader device can include dummy data in an encrypted form.

In some embodiments, the method further includes determining whether data responsive to the command is ready for transmission prior to expiration of a set time limit for response. The method can further include transmitting a first response to the reader device if it is determined that data responsive to the command is not ready for transmission prior to expiration of the set time limit for response. The method can further include transmitting a second response to the reader device if it is determined that data responsive to the command is ready for transmission prior to expiration of the set time limit for response.

In some embodiments, the method can further include transmitting a plurality of first responses to the reader device, where each first response includes dummy data, and where each first response is transmitted prior to expiration of a set time limit for response.

In some embodiments, the dummy data can be a predetermined code, can be indicated by a flag in a header of the at least one first response, or can be pseudorandom data.

In some embodiments, the method can further include generating the dummy data according to a dummy data algorithm.

In some embodiments, the on body device can include a first semiconductor device and a second semiconductor device communicatively coupled to the first semiconductor device with a communication interface. The communication interface can be a serial peripheral interface. The method can further include: outputting a request for responsive data from the first semiconductor device to the second semiconductor device over the communication interface; generating the responsive data by the second semiconductor device; and outputting the responsive data from the second semiconductor device to the first semiconductor device over the communication interface, prior to transmitting the at least one second response to the reader device. The first semiconductor device can be configured to format data according to a near field communication (NFC) protocol. The second semiconductor device can be configured to format data according to a Bluetooth communication protocol.

In some embodiments, the method can further include: processing the received command; and wirelessly transmitting at least one third response to the reader device prior to wirelessly transmitting the at least one first response to the reader device. The at least one third response can include at least one of a start of frame indication, a flag, or a communication parameter. The method can further include wirelessly transmitting at least one fourth response after wirelessly transmitting the at least one second response. The at least one fourth response can include error detection information or an end of frame indication.

In some embodiments, wireless communication between the on body device and the reader device is in accordance with a near field communication (NFC) protocol.

In many embodiments, an on body device of an analyte monitoring system is provided, the on body device including: communication circuitry configured to wirelessly receive a command and wirelessly transmit one or more responses; and processing circuitry configured to generate dummy data and data responsive to the command, where the on body device is configured to wirelessly transmit at least one first response including the dummy data and at least one second response including the data responsive to the command.

In some embodiments, the on body device can be configured such that the processing circuitry processes the received command while the communication circuitry transmits the at least one first response. The processing circuitry can be configured to encrypt the data responsive to the command and output the encrypted responsive data to the communication circuitry. The processing circuitry can be configured to encrypt the dummy data and output the encrypted dummy data to the communication circuitry.

In some embodiments, the on body device can be configured to determine whether data responsive to the command is ready for transmission prior to expiration of a set time limit for response.

In some embodiments, the processing circuitry can be configured to cause transmission of the first response prior to expiration of a set time limit for response, after determination that data responsive to the command is not ready for transmission.

In some embodiments, the processing circuitry can be configured to cause transmission of the second response prior to expiration of the set time limit for response, after determination that data responsive to the command is ready for transmission.

In some embodiments, the on body device can be configured to transmit a plurality of first responses, where each first response includes dummy data, and where each first response is transmitted prior to expiration of a set time limit for response.

In some embodiments, the dummy data can be: a predetermined code, indicated by a flag in a header of the at least one first response, pseudorandom data, or generated according to a dummy data algorithm.

In some embodiments, the on body device can include a first semiconductor device and a second semiconductor device communicatively coupled to the first semiconductor device with a communication interface. The communication interface can be a serial peripheral interface. A first portion of the processing circuitry can be located on the first semiconductor device and a second portion of the processing circuitry is located on the second semiconductor device. The first semiconductor device can be configured to output a request for responsive data over the communication interface to the second semiconductor device. The second semiconductor device can be configured to generate the responsive data and output the responsive data to the first semiconductor device over the communication interface. The first semiconductor device can be configured to format data according to a near field communication (NFC) protocol. The second semiconductor device can be configured to format data according to a Bluetooth communication protocol.

In some embodiments, the communication circuitry is configured to wirelessly receive and transmit in accordance with a near field communication (NFC) protocol.

In some embodiments, the processing circuitry is communicatively coupled with memory, and where the memory stores a plurality of instructions executable by the processing circuitry.

In many embodiments, a method of communication in an analyte monitoring system including an on body device and a reader device is provided, the method including: wirelessly transmitting, by the reader device, a command to the on body device; wirelessly receiving at least one first response from the on body device, where the at least one first response includes dummy data; and wirelessly receiving at least one second response from the on body device, where the at least one second response includes data responsive to the command.

In some embodiments, the method can further include determining, by the reader device, whether each of the at least one first responses includes dummy data.

In some embodiments, the method can further include determining, by the reader device, whether each of the at least one second responses includes data responsive to the command.

In some embodiments, the method can further include acting upon the data responsive to the command by the reader device. Acting upon the data responsive to the command can include storing the data responsive to the command or displaying the data responsive to the command.

In some embodiments, the method can further include determining, by the reader device, whether a total number (N) of received at least one first responses and at least one second responses is greater than an expected number (E) of responses. The method can further include: treating, by the reader device, the first N–E responses as dummy data; and treating, by the reader device, the remaining E responses as including data responsive to the command. The method can further include reading, by the reader device, the first N–E responses to confirm they comprise dummy data. The method can include decrypting, by the reader device, the received at least one second response. The method can further include decrypting, by the reader device, the received at least one first response. The dummy data can be: a predetermined code, indicated by a flag in a header of the at least one first response, pseudorandom data, or generated according to a dummy data algorithm.

In some embodiments, the reader device is communicating with an on body device.

In some embodiments, the reader device wirelessly receives and transmits in accordance with a near field communication (NFC) protocol. The method can further include wirelessly receiving data from an on body device according to a Bluetooth protocol.

In many embodiments, a reader device of an analyte monitoring system is provided, the reader device including: communication circuitry configured to wirelessly transmit a command and wirelessly receive one or more responses; and processing circuitry configured to determine whether each received response includes dummy data or data responsive to the command.

In some embodiments, the processing circuitry is configured to act upon the data responsive to the command.

In some embodiments, the processing circuitry is configured to store or display the data responsive to the command.

In some embodiments, the processing circuitry is configured to ignore or discard the dummy data.

In some embodiments, the processing circuitry is configured to decrypt each received response.

In some embodiments, the dummy data can be: a predetermined code, indicated by a flag in a header of the at least one first response, pseudorandom data, or generated according to a dummy data algorithm.

In some embodiments, the reader device is configured to communicate with an on body device.

In some embodiments, the communication circuitry is configured to wirelessly transmit and receive in accordance with a near field communication (NFC) protocol. The communication circuitry is first communication circuitry and the reader device includes second communication circuitry configured to wirelessly transmit and receive according to a Bluetooth protocol.

In some embodiments, the processing circuitry is communicatively coupled with memory, and where the memory stores a plurality of instructions executable by the processing circuitry.

In many embodiments, a reader device of an analyte monitoring system, the reader device including: communication circuitry configured to wirelessly transmit a command and wirelessly receive one or more responses; and processing circuitry configured to determine whether a total number (N) of received responses is greater than an expected number (E) of responses.

In some embodiments, the processing circuitry can be configured to treat the first N–E responses as dummy data and treat the remaining E responses as including data responsive to the command. The processing circuitry can be configured to read the first N–E responses to confirm they comprise dummy data. The processing circuitry can be configured to act upon the data responsive to the command. The processing circuitry can be configured to store or display the data responsive to the command. The processing circuitry can be configured to ignore or discard the first N–E responses without confirming the first N–E responses comprise dummy data. The processing circuitry can be configured to decrypt each received response.

In some embodiments, the dummy data can be: a predetermined code, indicated by a flag in a header of the at least one first response, pseudorandom data, or generated according to a dummy data algorithm.

In some embodiments, the reader device is configured to communicate with an on body device.

In some embodiments, the communication circuitry is configured to wirelessly transmit and receive in accordance with a near field communication (NFC) protocol. The communication circuitry can be first communication circuitry and the reader device can include second communication circuitry configured to wirelessly transmit and receive according to a Bluetooth protocol.

In many embodiments, a method of communication in an analyte monitoring system including an on body device and a reader device is provided, the method including: wirelessly receiving, by the on body device, a command from the reader device; wirelessly transmitting a predetermined number (P) of first responses from the on body device to the reader device, where each first response includes dummy data; and wirelessly transmitting at least one second response from the on body device to the reader device, where the at least one second response includes data responsive to the command.

In some embodiments, the method can further include processing the received command while transmitting the predetermined number of first responses to the reader device.

In some embodiments, processing the received command can include: generating the data responsive to the command; and encrypting the data responsive to the command. The at least one second response transmitted to the reader device can include data responsive to the command in an encrypted form. Each of the predetermined number of first responses transmitted to the reader device can include dummy data in an encrypted form.

In some embodiments, the method further includes counting, by the reader device, the number of responses received from the on body device. The method can further include treating the P+1th response as including data responsive to the command. The method can further include not confirming the first P received responses comprise dummy data.

In some embodiments, the method can further include reading, by the on body device, the received command and wirelessly transmitting a predetermined number (P) of first responses that corresponds to the received command. The received command is one of a plurality of commands, and where the reader device and on body device are programmed to identify the correct number of predetermined responses based on the command.

In some embodiments, the wireless communication between the on body device and the reader device is in accordance with a near field communication (NFC) protocol.

In many embodiments, an analyte monitoring system is provided, including: an on body device including communication circuitry and processing circuitry; and a reader device including communication circuitry and processing circuitry, where the on body device is configured to wirelessly receive a command from the reader device, wirelessly transmit a predetermined number (P) of first responses to the reader device, where each first response includes dummy data, and wirelessly transmit at least one second response to the reader device, where the at least one second response includes data responsive to the command.

In some embodiments, the on body device is configured to process the received command while transmitting the predetermined number of first responses to the reader device. The processing circuitry of the on body device can be configured to generate the data responsive to the command and encrypt the data responsive to the command. The processing circuitry of the on body device can be configured to encrypt the dummy data and transmit the dummy data in encrypted form.

In some embodiments, the processing circuitry of the reader device can be configured to account the number of responses received from the on body device. The processing circuitry of the reader device can be configured to treat the P+1th response as including data responsive to the command. The processing circuitry of the reader device can be configured to ignore or discard the first P received responses without performance of a confirmation that the first P received responses each comprise dummy data.

In some embodiments, the processing circuitry of the on body device is configured to read the received command and wirelessly transmit a predetermined number (P) of first responses that corresponds to the received command.

In some embodiments, the received command is one of a plurality of commands, and where the reader device and on body device are programmed to identify the correct number of predetermined responses based on the command.

In some embodiments, the communication circuitry of the on body device and the communication circuitry of the reader device are each configured to communicate in accordance with a near field communication (NFC) protocol.

In many embodiments, a method of communication in an analyte monitoring system including an on body device and a reader device is provided, the method including: receiving, at the on body device, a transmission including a custom command from the reader device, where the transmission is formatted according to a first communication protocol; communicating the custom command from a first semiconductor chip of the on-body device to a second semiconductor chip of the on-body device, where the first semiconductor chip includes communication circuitry adapted for communication over the first communication protocol and the second semiconductor chip includes a processor; causing transmission of a first data payload including dummy data from the on body device to the reader device within a set time limit for response according to the first communication protocol; communicating a response data payload from the second semiconductor chip to the first semiconductor chip; and causing transmission of the response data payload from the on body device to the reader device.

For each and every embodiment of a method disclosed herein, systems and devices capable of performing each of those embodiments are covered within the scope of the present disclosure. For example, embodiments of OBDs are disclosed and these devices can have one or more sensors, analyte monitoring circuits (e.g., an analog circuit), memories (e.g., for storing instructions), power sources, communication circuits, transmitters, receivers, processors and/or controllers (e.g., for executing instructions) that can perform any and all method steps or facilitate the execution of any and all method steps. These OBD embodiments can be used and can be capable of use to implement those steps performed by a OBD from any and all of the methods described herein.

For all the aforementioned embodiments, the actions carried out by the on body device can be performed, or caused to be performed, by processing circuitry of the on body device executing one or more instructions stored on memory of the on body device. Similarly for all the aforementioned embodiments, the actions carried out by the reader device can be performed, or cause to be performed, by processing circuitry of the reader device executing one or more instructions stored on memory of the reader device.

Computer program instructions for carrying out operations in accordance with the described subject matter can be stored on any non-transitory memory described herein and executed by processing circuitry communicatively coupled thereto. The computer program instructions can be written in any combination of one or more programming languages, including an object oriented programming language such as Java, JavaScript, Smalltalk, C++, C#, Transact-SQL, XML, PHP or the like and conventional procedural programming languages, such as the "C" programming language or similar programming languages. The program instructions may execute entirely on the user's computing device, partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computer (for example, through the Internet using an Internet Service Provider).

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A method of communication in an analyte monitoring system comprising an on body device and a reader device, the method comprising:
   wirelessly receiving, by the on body device, a command from the reader device; generating, by the on body device, dummy data configured to be inserted into a data frame;
   wherein the data frame comprises a non-empty frame body field;
   wirelessly transmitting at least one first response to the reader device based on determining that data responsive to the command is not ready for transmission prior to expiration of a set time limit for response, wherein the at least one first response comprises the dummy data within the data frame compliant with a communication protocol used for the wirelessly transmitting;
   wirelessly transmitting at least one second response to the reader device, wherein the at least one second response comprises data responsive to the command;
   wirelessly transmitting at least one of a start of frame indication, a flag, or a communication parameter prior to transmitting the at least one first response and the at least one second response;
   identifying, by the reader device, a subset of responses corresponding to a difference between a total number (N) of received responses and an expected number (E) of responses, wherein the total number (N) of received responses comprise the at least first response and the at least one second response;

designating the subset of responses as dummy data without confirming by payload inspection whether those responses comprise dummy data, and wherein the at least one first response and the at least one second response are transmitted in encrypted form such that the reader cannot distinguish dummy data by content prior to said counting.

2. The method of claim 1, further comprising processing the received command while transmitting the at least one first response to the reader device.

3. The method of claim 2, wherein processing the received command comprises:
generating the data responsive to the command; and
encrypting the data responsive to the command.

4. The method of claim 1, further comprising determining whether data responsive to the command is ready for transmission prior to expiration of the set time limit for response.

5. The method of claim 4, further comprising transmitting a first response to the reader device if it is determined that data responsive to the command is not ready for transmission prior to expiration of the set time limit for response.

6. The method of claim 4, further comprising transmitting a second response to the reader device if it is determined that data responsive to the command is ready for transmission prior to expiration of the set time limit for response.

7. The method of claim 1, further comprising transmitting a plurality of first responses to the reader device, wherein each first response comprises the dummy data, and wherein each first response is transmitted prior to expiration of a set time limit for response.

8. The method of claim 1, wherein the dummy data is a predetermined code.

9. The method of claim 1, wherein the on body device comprises a first semiconductor device and a second semiconductor device communicatively coupled to the first semiconductor device with a communication interface.

10. The method of claim 9, further comprising:
outputting a request for responsive data from the first semiconductor device to the second semiconductor device over the communication interface;
generating the responsive data by the second semiconductor device; and outputting the responsive data from the second semiconductor device to the first
semiconductor device over the communication interface, prior to transmitting the at least one second response to the reader device.

11. The method of claim 1, further comprising: treating, by the reader device, the first N−E responses as dummy data; and treating, by the reader device, the remaining E responses as including data responsive to the command.

12. The method of claim 11, further comprising reading, by the reader device, the first N−E responses to confirm they comprise dummy data.

13. An on body device of an analyte monitoring system, the on body device comprising:
communication circuitry configured to wirelessly receive a command and wirelessly transmit one or more responses; and
processing circuitry configured to generate dummy data configured to be inserted into a data frame and data responsive to the command, wherein the data frame comprises a non-empty frame body field,
wherein the on body device is configured to wirelessly transmit at least one first response comprising the dummy data within a data frame compliant with a communication protocol used for the wirelessly transmitting based on determining that the data responsive to the command is not ready for transmission prior to expiration of a set time limit for response; to wirelessly transmit at least one second response comprising the data responsive to the command after transmitting the dummy data; and to wirelessly transmit at least one of a start of frame indication, a flag, or a communication parameter prior to transmitting the at least one first response and the at least one second response, and wherein the reader device is configured to monitor a total number (N) of received responses and an expected number (E) of responses, the reader device includes processing circuitry configured to determine an expected number (E) of responses for a command from information included in the command, to count a total number (N) of responses received for the command, and, when N is greater than E, to designate (N−E) of the received responses as dummy data without confirming by payload inspection whether those responses comprise dummy data, and wherein the at least one first response and the at least one second response are transmitted in encrypted form such that the reader cannot distinguish dummy data by content prior to said counting.

14. The device of claim 13, wherein the on body device is configured such that the processing circuitry processes the received command while the communication circuitry transmits the at least one first response.

15. The device of claim 14, wherein the processing circuitry is configured to encrypt the data responsive to the command and output the encrypted responsive data to the communication circuitry.

16. The device of claim 13, configured to determine whether data responsive to the command is ready for transmission prior to expiration of the set time limit for response.

17. The device of claim 13, configured to transmit a plurality of first responses, wherein each first response comprises dummy data, and wherein each first response is transmitted prior to expiration of a set time limit for response.

18. The device of claim 13, wherein the on body device comprises a first semiconductor device and a second semiconductor device communicatively coupled to the first semiconductor device with a communication interface.

19. The device of claim 18, wherein a first portion of the processing circuitry is located on the first semiconductor device and a second portion of the processing circuitry is located on the second semiconductor device.

20. The device of claim 19, wherein the first semiconductor device is configured to output a request for responsive data over the communication interface to the second semiconductor device.

21. The device of claim 20, wherein the second semiconductor device is configured to generate the responsive data and output the responsive data to the first semiconductor device over the communication interface.

22. The device of claim 13, wherein the reader device is further configured to treat the first N−E responses as dummy data; and to treat the remaining E responses as including data responsive to the command.

23. The device of claim 22, wherein the reader device is further configured to read the first N−E responses to confirm they comprise dummy data.

\* \* \* \* \*